(12) United States Patent
Shi et al.

(10) Patent No.: US 12,359,510 B2
(45) Date of Patent: Jul. 15, 2025

(54) BIT CUTTING STRUCTURE AND PDC BIT FOR HIGHLY ABRASIVE FORMATIONS

(71) Applicant: SOUTHWEST PETROLEUM UNIVERSITY, Chengdu (CN)

(72) Inventors: Xiangchao Shi, Chengdu (CN); Zhaowei Wang, Chengdu (CN); Yun Zhuo, Chengdu (CN); Ye Jiao, Chengdu (CN); Rongrong Wang, Chengdu (CN); Zonglin Lyu, Chengdu (CN)

( * ) Notice: Subject to any disclaimer, the term of this patent is extended or adjusted under 35 U.S.C. 154(b) by 0 days.

(21) Appl. No.: 18/828,472

(22) Filed: Sep. 9, 2024

(65) Prior Publication Data
US 2025/0207464 A1 Jun. 26, 2025

(30) Foreign Application Priority Data
Dec. 20, 2023 (CN) .......................... 202311756192.4

(51) Int. Cl.
E21B 10/26 (2006.01)
E21B 10/46 (2006.01)

(52) U.S. Cl.
CPC .............. *E21B 10/26* (2013.01); *E21B 10/46* (2013.01)

(58) Field of Classification Search
CPC .................................. E21B 10/26; E21B 10/46
See application file for complete search history.

(56) References Cited

U.S. PATENT DOCUMENTS

| 2011/0192651 | A1* | 8/2011 | Lyons | E21B 10/5673 |
| | | | | 175/428 |
| 2016/0356093 | A1* | 12/2016 | Patel | E21B 10/5671 |
| 2021/0025242 | A1 | 1/2021 | Graham et al. | |

(Continued)

FOREIGN PATENT DOCUMENTS

| CN | 105275403 A | 1/2016 |
| CN | 111894470 A | 11/2020 |

(Continued)

OTHER PUBLICATIONS

Anthony Digiovanni et al., Innovative Non-Planar Face PDC Cutters Demonstrate 21% Drilling Efficiency Improvement in Interbedded Shales and Sand, IADC/SPE Drilling Conference and Exhibition, Mar. 2014, Fort Worth, Texas, USA.

(Continued)

*Primary Examiner* — Caroline N Butcher
(74) *Attorney, Agent, or Firm* — Addison D. Ault; IPGentleman Intellectual Property Services, LLC

(57) ABSTRACT

A bit cutting structure and a PDC bit for highly abrasive formations are provided. The PDC bit includes A-type cutting structures, B-type cutting structures and a bit body. The A-type cutting structures and the B-type cutting structures each include a front-row integrated compact and a rear-row conical tooth. Blades are arranged on the bit body, and conventional independent compacts are arranged on each blade. The A-type cutting structures and the B-type cutting structures are arranged on the blades. Each blade is provided with a front-row tooth position and a rear-row (Continued)

tooth position, and the front-row integrated compact and the rear-row conical tooth are respectively arranged on the front-row tooth position and the rear-row tooth position.

5 Claims, 6 Drawing Sheets

(56) References Cited

U.S. PATENT DOCUMENTS

2023/0287743 A1    9/2023   Brooks

FOREIGN PATENT DOCUMENTS

| CN | 213980653 U | 8/2021 |
| CN | 116427855 A | 7/2023 |

OTHER PUBLICATIONS

Jason Maw et al., "Paradigm Shift in Polycrystalline Diamond Bit Design for Canadian Heavy Oil Sands," Paper presented at the SPE Heavy Oil Conference Canada, Jun. 2012, Calgary, Alberta, Canada.
Notification to Grant Patent for China Application No. 202311756192.4, mailed May 21, 2024.
First Search Report for China Application No. 202311756192.4, dated May 11, 2024.

\* cited by examiner

BIT CUTTING STRUCTURE AND PDC BIT FOR HIGHLY ABRASIVE FORMATIONS

CROSS-REFERENCE TO RELATED APPLICATIONS

This application claims priority to Chinese Patent Application No. 202311756192.4, filed on Dec. 20, 2023, the contents of which are hereby incorporated by reference.

TECHNICAL FIELD

The disclosure relates to the technical fields of oil field machinery, oil and gas well construction and geothermal energy equipment, and in particular to a bit cutting structure and a PDC (polycrystalline diamond compact) bit for highly abrasive formations.

BACKGROUND

In the process of oil and gas well construction and geothermal energy well construction, it is inevitable to drill into dense and abrasive formations such as quartz sandstone, turbidite sand and granite. Usually, when drilling this kind of lithology, the nose part of PDC bit would contact with the formation first. Meanwhile, this part also has a relatively high curvature. Thus, under the action of high rotational speed and axial impact near-bit, a local higher temperature would be generated because of the interaction between cutters and rock, which accelerates the thermal stress and aggravate the wear speed of PDC bit. It is also possible that the high temperature causes the sintered material between the polycrystalline diamond layer and the cemented carbide to soften, leading to the detachment of the polycrystalline diamond layer. Consequently, the drill bit wears too fast and fails prematurely. Therefore, in most failure cases, the ring out characteristic occurs at the nose and shoulder part mostly (that is, only the metal matrix contacts with the formation after the cutting structure of the nose and shoulder part loses the polycrystalline diamond layer prematurely, resulting in the annular groove after the matrix wears). In some working conditions of drilling dense and abrasive formations, the inner cone part of the bit may wear out too quickly in advance and lead to cored characteristic (that is, only the metal matrix contacts the formation after the cutting structure of the inner cone part loses the polycrystalline diamond layer prematurely), which may eventually lead to the need to trip out and replace the bit, increasing the risk and cost of well construction, and greatly restricting the rate of penetration and total drilling footage of the PDC bit in dense and highly abrasive formations.

In order to solve this problem, the existing technical means mainly reduce the tooth diameter in a certain part of the bit, and further increase the tooth distribution density by increasing the layout space through segmented blades (Liu Baxian et al. Anti-ring-cutting PDC bit [P]. Chinese Patent Publication NO. 116427855A, published on Jul. 14, 2023), and develop non-planar polycrystalline diamond compact to increase the cooling efficiency of the tooth surface and reduce the wear speed (DiGiovanni, Anthony. Innovative Non-Planar Face PDC Cutters Demonstrate 21% Drilling Efficiency Improvement in Interbedded Shales and Sand. IADC/SPE Drilling Conference and Exhibition, Fort Worth, Texas, USA, March 2014.), or use continuous polycrystalline diamond cutting structure to reduce the friction area between the whole bit and the formation and prevent thermal wear (Maw, Jason, et al. Paradigm Shift in Polycrystalline Diamond Bit Design for Canadian Heavy Oil Sands. Paper presented at the SPE Heavy Oil Conference Canada, Calgary, Alberta, Canada, June 2012.). Among the existing technical means, directly densifying the tooth distribution density would probably reduce the rock-breaking efficiency of PDC bit much, which will lead to the decrease of drilling footage speed. Although the non-planar polycrystalline diamond cutter may improve the problem of accelerated wear of single cutter surface due to thermal stress, the area of bit alloy matrix exposed between teeth is still too much in the whole radial tooth distribution profile, so the risk of ring out may not be avoided flexibly. Although the brazing design of continuous polycrystalline diamond compact may significantly enhance the drilling footage capacity of the bit, this design results in no clearance between the teeth of the entire bit due to the completely filling of the entire radial tooth distribution profile, and further leads to the failure of the bit to form a high stress concentration area between the teeth to improve the rock breaking efficiency, thus sacrificing excessive drilling footage speed with only a certain improvement in the bit life.

In oil and gas well construction and dry-hot-rock well construction projects, the dense and highly abrasive formations mainly include tight sandstone, marble, granite, basalt and other rock types, and the main components are quartz, silica, alumina, calcite, dolomite, feldspar, etc. This kind of lithology contains almost no clay component, and has low viscosity when exposed to water, and may be quickly washed and removed after the fluid passes through.

The cutting structure mainly includes a front-row tooth and a rear-row tooth. The front-row tooth, also known as a first-row tooth, as the main cutting element of the bit to break the formation, sometimes appears alone, and sometimes forms a certain cutting structure with the second-row tooth locally. The rear-row tooth, also known as the second-row tooth, is usually arranged at the rear side of the front-row tooth in the same track as the front-row tooth with a designed depth of cutting, with the purpose of fracturing the formation in advance (the rear-row tooth is higher than the front-row tooth) or controlling the cutting depth of the front-row tooth (the rear-row tooth is lower than the front-row tooth). The geometry profile of the rear-row tooth may be plane tooth, ball-headed tooth, conical tooth, flat-headed tooth, etc., together with the front-row tooth to form the cutting structure.

Nozzles are distributed at different radial and circumferential positions of the bit body, and drilling cooling fluid is sprayed from the nozzles to cool the tooth surface and remove the cuttings on the tooth surface. In the above-mentioned highly abrasive formations, the cuttings mainly appear in the form of rock powder with low viscosity, so the cuttings may be quickly removed and hardly form an insulation layer adhering to the polycrystalline diamond layer on the tooth surface, which provides the established conditions for an integrated compact having grooves proposed by the disclosure which would accelerate cooling polycrystalline diamond composite layer.

SUMMARY

An objective of the disclosure is to provide a bit cutting structure and a PDC bit for highly abrasive formations, so as to solve the problems existing in the prior art. By flexibly placing the new anti-wear and speed-increasing cutting structure in the cone part, nose part, shoulder part or gauge part of the bit, the size of the high stress concentration area between the teeth of the whole bit may be individually adjusted to improve the service life and drilling footage capacity of the bit under the premise of minimizing the sacrifice of machine speed.

In order to achieve the above object, the disclosure provides the following solution. The disclosure provides a cutting structure for a PDC bit, including A-type cutting structures and B-type cutting structures, where the A-type cutting structures and the B-type cutting structures are each include a front-row integrated compact and a rear-row conical tooth.

The front-row integrated compact and the rear-row conical tooth of each of the A-type cutting structures are used to be arranged on an inner cone part of the PDC bit, and the front-row integrated compact and the rear-row conical tooth of each of the B-type cutting structures are used to be arranged on a curvature part of the PDC bit.

A number of the A-type cutting structures and the B-type cutting structures distributed on the PDC bit is determined based on a relationship between abrasiveness of a formation and the number of the A-type cutting structures and the B-type cutting structures distributed on the PDC bit.

In some embodiments, a cross section of the front-row integrated compact is a rectangle, a width of the rectangle is $L_2$, and a height of the rectangle is $H_2+H_3$; a tooth surface of the front-row integrated compact is provided with a groove, and the groove is correspondingly arranged with a difference tool body; a length of a bottom of a cross section of the difference tool body is $L_1$, and a height of the cross section of the difference tool body is $H_1$, where $H_1 \leq H_2/2$, $L_1 \leq \frac{1}{6} \times L_2$, and a length of $L_2$ is 13.44 millimeter (mm)-25 mm.

In some embodiments, an included $\alpha_1$ an included angle $\alpha_2$ are set between the cross section of the difference tool body and the rectangle, and the included angle $\alpha_1$ and the included angle $\alpha_2$ are 0 degree (°)-90°.

In some embodiments, in the A-type cutting structures, the front-row integrated compact is provided with a point $i_1$ and a point $i_2$, and a curve between the point $i_1$ and the point $i_2$ has no curvature; in the B-type cutting structures, the front-row integrated compact is provided with a point $i_3$ and a point $i_4$, and there is curvature between the point $i_3$ and the point $i_4$, and the curvature between the point $i_3$ and a point $i_4$ is consistent with curvature of the curvature part on the bit.

In some embodiments, a height of the front-row integrated compact is lower than a height of the rear-row conical tooth.

A PDC bit for highly abrasive formations is provided, which includes a bit body, where multiple blades and multiple nozzle groups are arranged on the bit body, and conventional independent compacts are arranged on each of the blades; the A-type cutting structures and the B-type cutting structures are arranged on the blades; and each of the blades is provided with a front-row tooth position and a rear-row tooth position, and the front-row integrated compact and the rear-row conical tooth are respectively arranged on the front-row tooth position and the rear-row tooth position.

In some embodiments, a front-row tooth exposure height $\Delta L_1$ is formed between a blade radial line and a radial tooth distribution line of the front-row tooth position, and a front-rear row tooth height difference $\Delta L_2$ is formed between the radial tooth distribution line of the front-row tooth position and a radial tooth distribution line of the rear-row tooth position, where $0 < \Delta L_2/\Delta L_1 \leq 0.5$.

In some embodiments, in the radial tooth distribution line of the front-row tooth position and the radial tooth distribution line of the rear-row tooth position, $l_1$ is a central axis of the rear-row conical tooth, and $l_1^1$ and $l_1^2$ are variants of $l_1$, and $l_1$, $l_1^1$, and $l_1^2$ intersect and are perpendicular to the radial tooth distribution line of the front-row tooth position; if the radial tooth distribution line of the front-row tooth position has curvature, $l_1$, $l_1^1$, and $l_1^2$ are perpendicular to tangent lines $Tl_1$, $Tl_2$ and $Tl_3$ drawn by arcs at intersection points, and a radial position of the rear-row conical tooth under $\Delta L_2$ is adjustable by adjusting a position of $l_1$ to $l_1^1$ and $l_1^2$.

In some embodiments, when a drilled formation is known to be the highly abrasive formation, and when an annular abrasion phenomenon occurs on the bit tripped out from an adjacent well in a same layer segment, multiple B-type cutting structures are arranged on nose and shoulder parts of the bit body; when a core ejection phenomenon occurs on the bit tripped out from the adjacent well in the same layer segment, multiple A-type cutting structures are arranged on the inner cone part of the bit body; and when the annular abrasion and the core ejection simultaneously occur, the multiple A-type cutting structures and the multiple B-type cutting structures are simultaneously arranged on the bit body.

Compared with the prior art, the disclosure has following advantages and technical effects.

The disclosure provides a bit cutting structure and a PDC bit for highly abrasive formations, and the proposed bit at least includes the A-type cutting structure and the B-type cutting structure at the curvature part. The new cutting structure may firstly perform point-to-face pre-splitting and crushing effect on the contacted formation by virtue of the plowing effect of conical teeth on the abrasive hard formation and form unconfined rock ridges, and then quickly remove the unconfined rock ridges by virtue of the front-row conventional independent compacts or the front-row integrated compacts. The front-row integrated compact greatly improves the thermal wear resistance of the bit in the highly abrasive formation, thus further improving the service life of the bit in the highly abrasive formation with high rock breaking efficiency, which allows the designer to flexibly arrange the number and coverage of integrated compacts according to the abrasiveness of the formation, and reserve the space of high stress concentration area between teeth in the single-tooth distribution mode to the maximum extent on the premise of ensuring the service life of the bit, so as to improve the rate of penetration and finally reduce the drilling cost.

BRIEF DESCRIPTION OF THE DRAWINGS

In order to explain the embodiments of the disclosure or the technical solution in the prior art more clearly, the drawings needed in the embodiments will be briefly introduced below. Apparently, the drawings in the following description are only some embodiments of the disclosure, and other drawings may be obtained according to these drawings by those skilled in the art without creative effort.

DETAILED DESCRIPTION OF THE EMBODIMENTS

Figure 1:
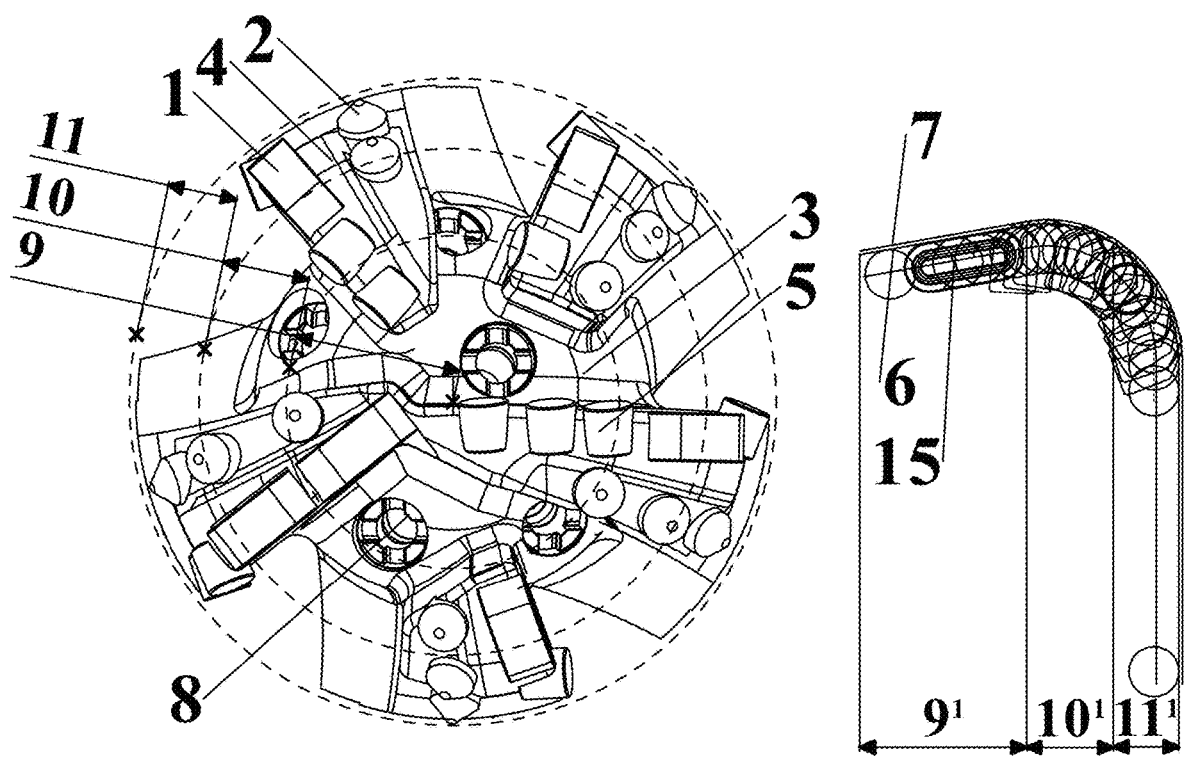
FIG. 1 is a schematic diagram of a top view of a bit according to the disclosure.
Figure 2:
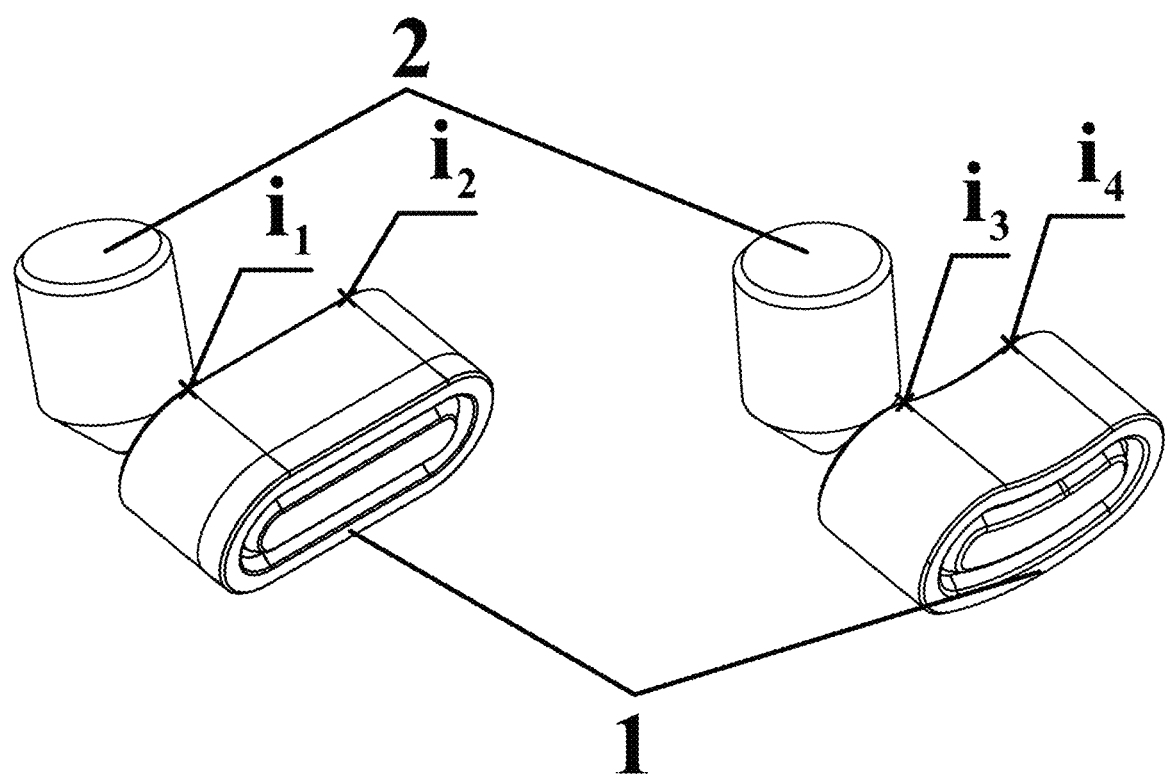
FIG. 2 is a schematic diagram of new cutting structures for a highly abrasive formation according to the disclosure.
Figure 3:
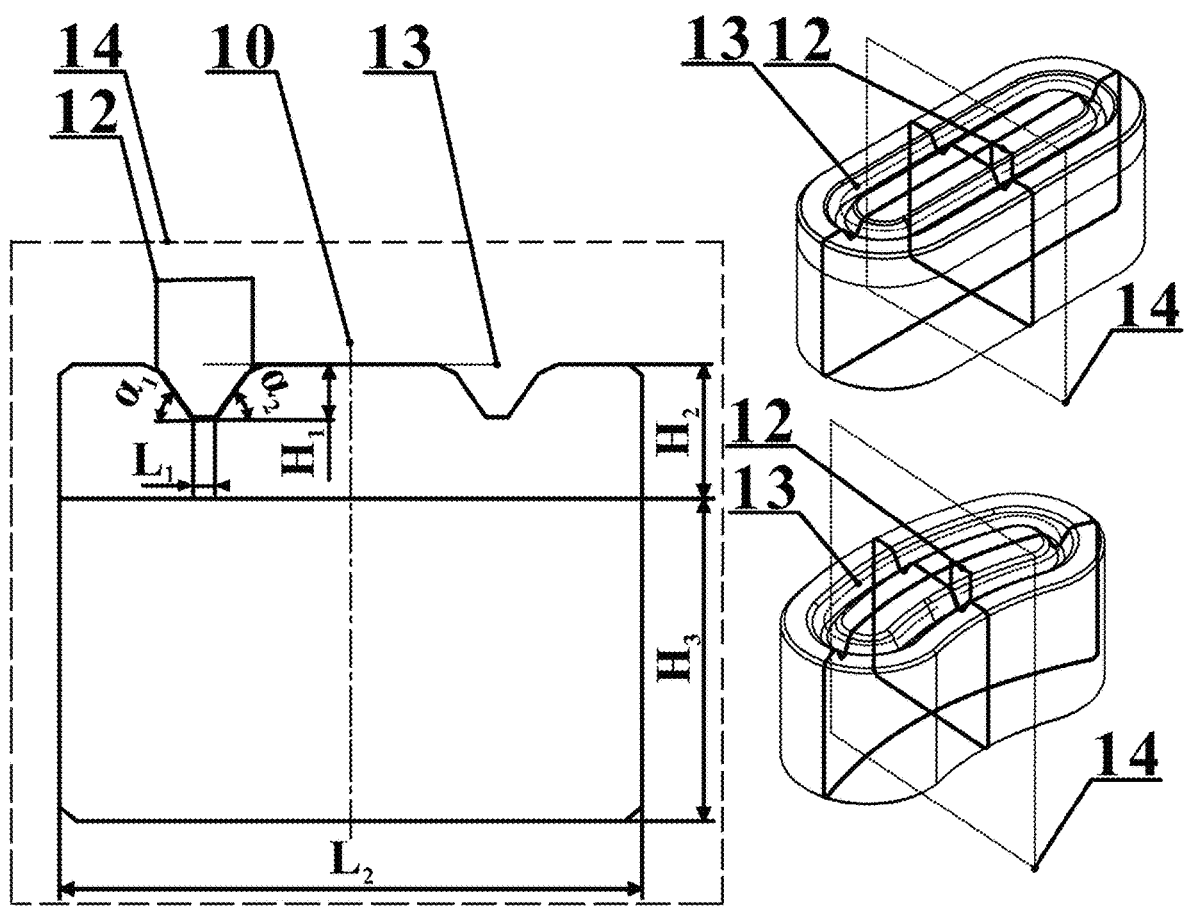
FIG. 3 is a schematic diagram of geometric characteristics of front-row integrated compacts according to the disclosure.
Figure 4:
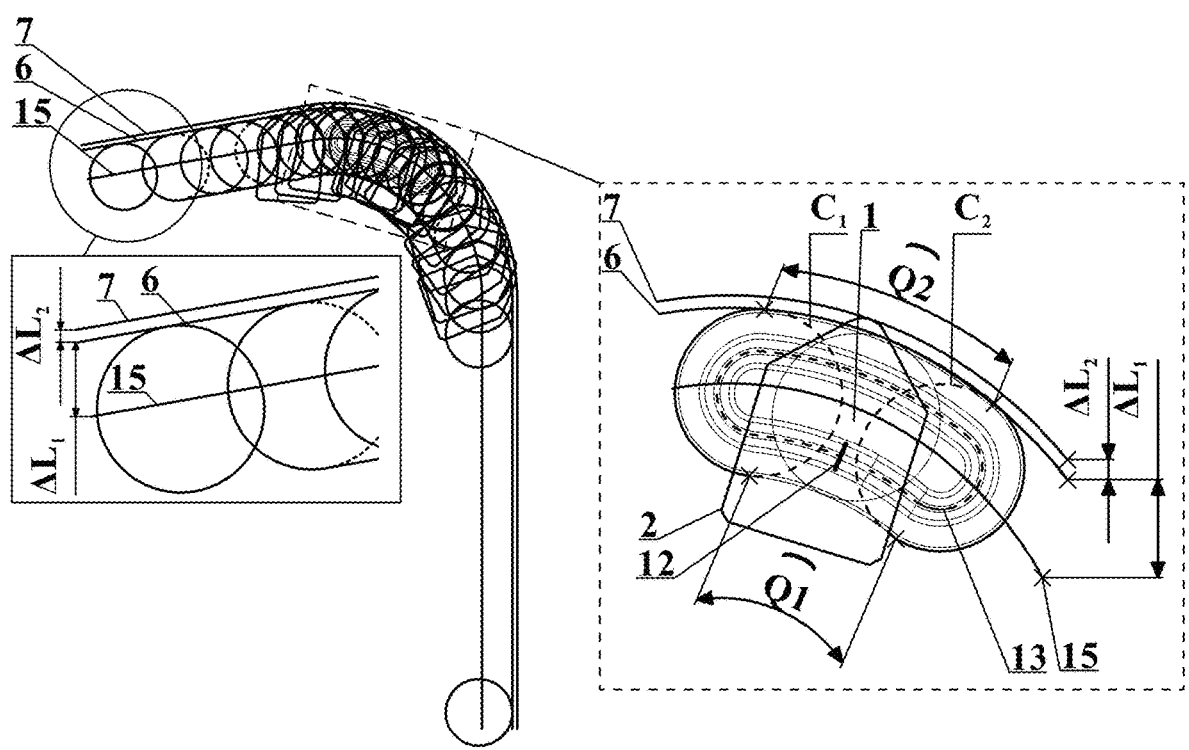
FIG. 4 is a schematic diagram of the new cutting structure designed for a bit with (without) curvature according to the disclosure.
Figure 5:
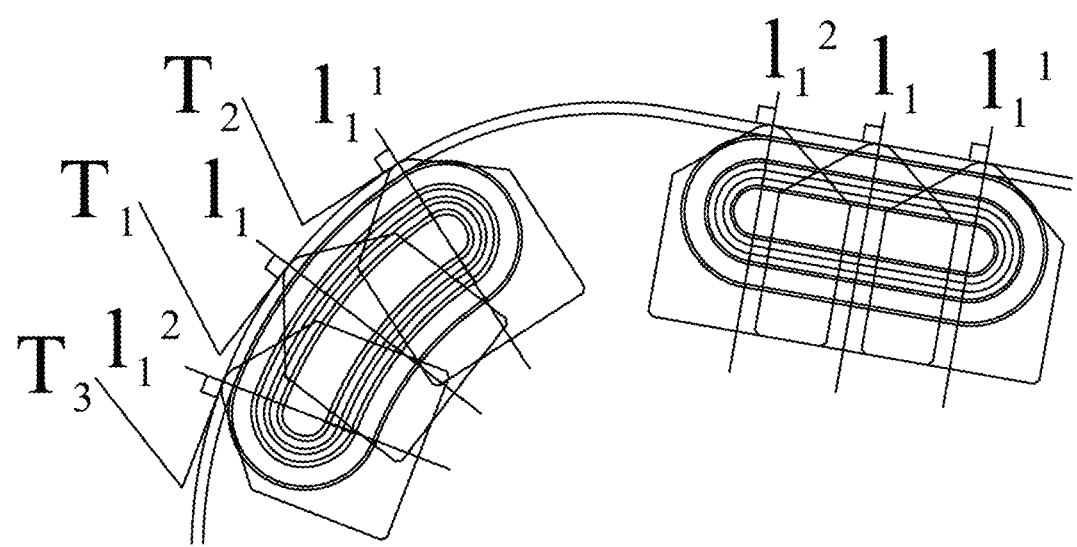
FIG. 5 is a schematic diagram of assembly modes of the new cutting structures designed for the bit with (without) curvature according to the disclosure.
Figure 6:
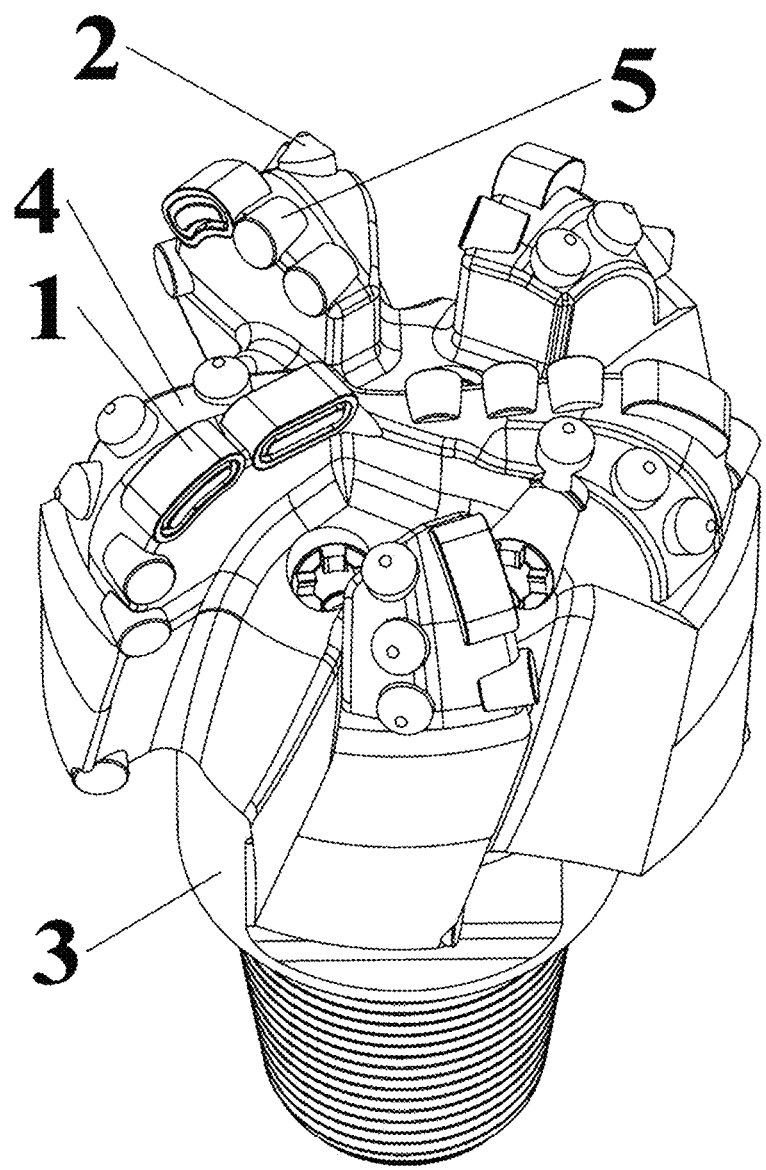
FIG. 6 is a schematic diagram of an overall structure of the bit according to the disclosure.

The technical solution in the embodiment of the disclosure will be described clearly and completely with reference to the attached drawings. Apparently, the described embodiments are only a part of the embodiments of the disclosure, but not all the embodiments. Based on the embodiments in the disclosure, all other embodiments obtained by those skilled in the art without creative effort belong to the protection scope of the disclosure.

In order to make the above objects, features and advantages of the disclosure clearer and easier to understand, the disclosure will be further described in detail with the attached drawings and specific embodiments.

With reference to FIG. 1-FIG. 6, the disclosure provides a cutting structure for a PDC bit, which includes A-type cutting structures and B-type cutting structures. The A-type cutting structure and the B-type cutting structure are each include a front-row integrated compact 1 and a rear-row conical tooth 2. The front-row integrated compact 1 and the rear-row conical tooth 2 of the A-type cutting structure are configured to be arranged on an inner cone part 9 of the PDC bit, and the front-row integrated compact 1 and the rear-row conical tooth 2 of the B-type cutting structure are configured to be arranged on a curvature part of the PDC bit. The front-row integrated compact 1 may be understood to be a front-row integrated cutter, and the rear-row conical tooth 2 may be understood to be rear-row conical cutter herein.

In an embodiment, the cross section of the front-row integrated compact 1 is a rectangle, the width of the rectangle is $L_2$, and the height of the rectangle is $H_2+H_3$. The tooth surface (i.e., the cutting surface) of the front-row integrated compact 1 is provided with a groove, and the groove corresponds to a difference tool body. The length of the bottom of the cross section 12 of the difference tool body is $L_1$, and the height of the cross section 12 of the difference tool body is $H_1$, where $H_1 \leq H_2/2$, $L_1 \leq \frac{1}{6} \times L_2$, and the length of $L_2$ is 13.44 mm-25 mm.

The length $L_1$ of the bottom of the cross section 12 of the difference tool body, the height $H_1$ of the cross section 12 of the difference tool body, and the oblique angles $\alpha_1$ and $\alpha_2$ of the cross section 12 of the difference tool body are adjusted within the above allowable range, so that the groove is deeper and wider, with a larger heat exchange area and more heat exchange fluid volume, and the risk of thermal wear failure of the polycrystalline diamond composite layer is prevented.

$H_2$ represents the thickness of polycrystalline diamond layer and $H_3$ represents the thickness of cemented carbide layer.

The two-dimensional stretched cross section 14 of the original three-dimensional stretched body of the front-row integrated compact 1 includes the projection of the tooth $C_1$ and tooth $C_2$ arranged by the same blade 4 in a single-tooth distribution mode on the view of a radial tooth distribution line 6 of a front-row tooth position, and the curves $Q_1$ and $Q_2$ between $C_1$ and $C_2$: when designing the front-row integrated compact 1 for the inner cone, the curves $Q_1$ and $Q_2$ are straight lines, and the stretched cross section is stretched along the normal direction of the $C_1$ or $C_2$ plane, and the stretched length is $H_2+H_3$. After the stretching is completed, the original stretched body of the integrated compact is formed, the cross section 12 of the difference tool body is swept along the sweeping trajectory 13 to obtain the difference tool body. A Boolean difference operation is performed between the original stretched body of the front-row integrated compact 1 and the difference tool body to form a front-row integrated compact 1 required for forming the A-type cutting structure or the B-type cutting structure. The front-row integrated compact 1 has a groove on its tooth surface (i.e., the cutting surface), so the drilling fluid passing through the tooth surface will immediately remove abrasive cuttings with lower viscosity, forming a liquid flow in the groove, increasing the cooling area, fully cooling the tooth surface and reducing the thermal wear degree of the polycrystalline diamond layer.

In an embodiment, the included angle $\alpha_1$ and the included angle $\alpha_2$ are set between the rectangle and the cross section 12 of the difference tool body, and the included angle $\alpha_1$ and the included angle $\alpha_2$ are 0°-90°, where $\alpha_1$ and $\alpha_2$ respectively represent the oblique angles of the cross section 12 of the difference tool body, and $\alpha_1$ and $\alpha_2$ may both vary from 0° to 90°.

In an embodiment, in the A-type cutting structure, the front-row integrated compact 1 is provided with a point $i_1$ and a point $i_2$, and the curve between the point $i_1$ and the point $i_2$ has no curvature. In the B-type cutting structure, the front-row integrated compact 1 is provided with a point $i_3$ and a point $i_4$, and there is curvature between the point $i_3$ and the point $i_4$, and the curvature between the point $i_3$ and the point $i_4$ is consistent with the curvature of the curvature part on the bit.

The A-type cutting structure is designed for the inner cone part 9 of the bit, and the B-type cutting structure is designed for the parts with certain curvature, such as the nose part 10, the shoulder and gauge part 11, and the curvature is consistent with the nose part 10 or the shoulder and gauge part 11 in the radial tooth distribution line 6 of the front-row tooth position where the front-row conventional independent compacts 5 or the front-row integrated compact 1 is located.

In an embodiment, the height of the front-row integrated compact 1 is lower than the height of the rear-row conical tooth 2. In this embodiment, the height may be understood to be the installation height.

The height of the front-row integrated compact 1 is smaller than the height of the rear-row conical tooth 2, and the radial tooth distribution line may completely cover the bottom hole.

A PDC bit for highly abrasive formations is provided, which includes a bit body 3. Multiple blades 4 and multiple nozzle groups 8 are arranged on the bit body 3, and conventional independent compacts 5 are arranged on each of the blades 4; the A-type cutting structure and the B-type cutting structure are arranged on the blades 4. The blade 4 is provided with a front-row tooth position and a rear-row tooth position, and the front-row integrated compact 1 and the rear-row conical tooth 2 are respectively arranged on the front-row tooth position and the rear-row tooth position. In this embodiment, the front-row tooth position may be understood to be the front-row space for the front-rear cutters, and the rear-row tooth position may be understood to be the rear-row space for the rear-row cutters.

With reference to FIG. 1, each blade 4 has the A-type cutting structure or the B-type cutting structure at least in the inner cone part 9 ($9^1$ in the radial plan view), the nose part 10 ($10^1$ in the radial plan view) or the shoulder and gauge part 11 ($11^1$ in the radial plan view). The division of the inner cone part 9, the nose part 10, and the shoulder and gauge diameter part 11 is shown in FIG. 1, the inner cone part 9 has no curvature, and the nose part 10, the shoulder and gauge part 11 have certain curvature. When a certain part of the whole bit is designed with conventional independent compacts 5, during the rock breaking process, a high stress concentration area S is formed between independent single teeth, which helps to improve the rate of penetration and increases the risk of thermal wear of the bit in this part. When a certain part of the whole bit is designed with the A-type cutting structure or the B-type cutting structure, the groove feature on the front-row integrated compact 1 may accelerate the cooling of the polycrystalline diamond layer and reduce the risk of thermal wear of the bit at this part. However, the formation of high stress concentration area S is reduced at the same time, resulting in a decrease in rate of penetration. Therefore, it is necessary to flexibly adjust the number of A-type cutting structures or B-type cutting structures according to the abrasiveness of the formation, and improve the service life of the bit with as little loss of rate of penetration as possible, so as to increase the total drilling footage of the bit and reduce the cost of drilling engineering.

In an embodiment, a front-row tooth exposure height $\Delta L_1$ is formed between the blade radial line 15 and the radial tooth distribution line 6 of the front-row tooth position, and a front-rear row tooth height difference $\Delta L_2$ is formed between the radial tooth distribution line 6 of the front-row tooth position and a radial tooth distribution line 7 of a rear-row tooth position, where $0 < \Delta L_2/\Delta L_1 \leq 0.5$. In this embodiment, the blade radial line may be understood to be the blade radial profile, the radial tooth distribution line of the front-row tooth position may be understood to be the radial profile for the front-row cutters, and the radial tooth distribution line of the rear-row tooth position may be understood to be the radial profile for the rear-row cutters.

The front-rear row tooth height difference $\Delta L_2$ formed between the radial tooth distribution line 6 of the front-row tooth position and the radial tooth distribution line 7 of the rear-row tooth position is increased within the allowable range to make the unconfined rock ridge higher, so as to improve the crushing efficiency of the integrated compact cutting rock ridge. Moreover, the bit relies on $\Delta L_2$ to form the unconfined rock ridge, and the height of the unconfined rock ridge is about equal to $\Delta L_2$. The higher the height of the unconfined rock ridge, the easier it is to be broken by the front-row tooth. The front-rear row tooth height difference $\Delta L_2$ formed between the radial tooth distribution line of the front-row tooth position and the radial tooth distribution line of the rear-row tooth position is increased within the allowable range to make the unconfined rock ridge higher, so as to improve the crushing efficiency of the integrated compact cutting rock ridge.

In an embodiment, in the radial tooth distribution line 6 of the front-row tooth position and the radial tooth distribution line 7 of the rear-row tooth position, $l_1$ is the central axis of the rear-row conical tooth 2, and $l_1^1$ and $l_1^2$ are variants of $l_1$. And $l_1$, $l_1^1$, and $l_1^2$ intersect and are perpendicular to the radial tooth distribution line 6 of the front-row tooth position. If the radial tooth distribution line 6 of the front-row tooth position has curvature, $l_1$, $l_1^1$ and $l_1^2$ are perpendicular to tangent lines $Tl_1$, $Tl_2$ and $Tl_3$ drawn by arcs at intersection points, and a radial position of the rear-row conical tooth 2 under $\Delta L_2$ can be adjusted by adjusting the position of $l_1$ to $l_1^1$, $l_1^2$.

In an embodiment, when a drilled formation is a highly abrasive formation, and when an annular abrasion phenomenon occurs on the bit tripped out from an adjacent well in the same layer segment, multiple B-type cutting structures may be arranged on nose and shoulder parts of the bit body 3. When a core ejection phenomenon occurs on the bit tripped out from the adjacent well in the same layer segment, multiple A-type cutting structures may be arranged on the inner cone part 9 of the bit body 3. And when the annular abrasion and the core ejection simultaneously occur, the multiple A-type cutting structures and the multiple B-type cutting structures may be simultaneously arranged on the bit body 3. In this embodiment, the annular abrasion phenomenon may be understood to be a ring out characteristic, and the core ejection phenomenon may be understood to be a cored characteristic.

When designing the bit, the number of high stress areas S between teeth may be determined according to the abrasiveness and density of the formation, and the multiple A-type cutting structures and the multiple B-type cutting structures are set locally on the bit.

When the drilled formation is known to be the highly abrasive formation, and when an annular abrasion phenomenon occurs on the bit tripped out from the adjacent well in the same layer segment, it may be considered to assemble multiple B-type cutting structures on the nose and shoulder parts of the bit body 3, and the specific number depends on the abrasiveness of the formation.

When a core ejection phenomenon occurs on the bit tripped out from the adjacent well in the same layer segment, multiple A-type cutting structures may be arranged on the inner cone part 9 of the bit body 3, and the specific number depends on the abrasiveness of the formation.

When the annular abrasion and the core ejection occur at the same time, multiple A-type cutting structures and multiple B-type cutting structures are set on the bit body 3 at the same time, and the specific number depends on the abrasiveness of the formation.

Specifically, each blade 4 has the new A-type cutting structure or the new B-type cutting structure at least in the inner cone part 9 ($9^1$ in the radial plan view), the nose part 10 ($10^1$ in the radial plan view) or the shoulder and gauge part 11 ($11^1$ in the radial plan view). The division of the inner cone part, the nose part, and the shoulder and gauge part is shown in FIG. 1.

In order to prevent the core ejection of the inner cone part 9, the inner cone part 9 is equipped with the A-type cutting structure, but in order to keep the high stress concentration area S between the teeth of the nose part 10 and the shoulder and gauge part 11 to ensure the rate of penetration, the front-row conventional independent compacts 5 are used for the conventional single-tooth distribution design in these parts.

In order to prevent the annular abrasion of the nose part 10, the nose part 10 is equipped with at least one B-type cutting structure, and the number of the B-type cutting structures is not more than the total number of blades 4. The inner cone part 9 and the shoulder and gauge part 11 still use the front-row conventional independent compacts 5 for the conventional single-tooth distribution design to reserve the high stress concentration area S between the teeth of the corresponding part to ensure the rate of penetration.

In order to prevent the annular abrasion of the shoulder and gauge part 11, at least one B-type cutting structure is assembled on the shoulder and gauge part 11, and the number of the B-type cutting structures is not more than the total number of blades 4. The inner cone part 9 and the nose part 10 still use the front-row conventional independent compacts 5 for the conventional single-tooth distribution design to keep the high stress concentration area S between the teeth of the corresponding part to ensure the rate of penetration.

In order to simultaneously prevent the core ejection of the inner cone part 9 and the annular abrasion of the nose part 10, at least one A-type cutting structure and/or B-type cutting structure (not more than the total number of blades 4) is assembled on each of the inner cone part 9 and the nose part 10. The shoulder and gauge part 11 still uses the front-row conventional independent compacts 5 for the conventional single-tooth distribution design to keep the high stress concentration area S between the teeth of the corresponding part to ensure the rate of penetration.

In order to prevent the core ejection of the inner cone part 9, the annular abrasion of the nose part 10 and annular abrasion of the shoulder and gauge part 11 at the same time, the A-type cutting structure and/or the B-type cutting structure (not more than the total number of blades 4) is assembled on each of the inner cone part 9, the nose part 10, the shoulder and gauge part 11. The high stress concentration area S between the A-type cutting structure and the B-type cutting structure is reserved, so as to reduce the sacrifice degree of the rate of penetration of the bit.

In order to prevent the core ejection of the inner cone part 9, the annular abrasion of the nose part 10, and the annular abrasion of the shoulder and gauge part 11 at the same time, the inner cone part 9, the nose part 10, the shoulder and gauge part 11 are each equipped with the A-type cutting structure and/or the B-type cutting structure, and the A-type cutting structure or the B-type cutting structure has almost no high stress concentration area S, so as to ensure that the bit may slowly drill into the extremely abrasive formation in the "ploughing and grinding" manner without being scrapped quickly.

In the description of the disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the disclosure, and do not indicate or imply that the device or element referred to must have a specific orientation, be constructed and operated in a specific orientation, and therefore may not be understood as a limitation of the disclosure.

The above-mentioned embodiments only describe the preferred mode of the disclosure, and do not limit the scope of the disclosure. Under the premise of not departing from the design spirit of the disclosure, various modifications and improvements made by those skilled in the art to the technical solution of the disclosure shall fall within the protection scope determined by the disclosure.

What is claimed is:

1. A cutting structure for a PDC bit, comprising: A-type cutting structures and B-type cutting structures, wherein the A-type cutting structures and the B-type cutting structures are each composed of a front-row integrated compact and a rear-row;

the front-row integrated compact and the rear-row of a conical tooth of each of the A-type cutting structures are arranged on an inner cone part of the PDC bit, and the front-row integrated compact and the rear-row of each of the B-type cutting structures are arranged on a curvature part of the PDC bit;

wherein;

a cross section of the front-row integrated compact is a rectangle, a width of the rectangle is $L_2$, and a height of the rectangle is $H_2+H_3$; a tooth surface of the front-row is provided with a groove; a length of a bottom of a cross section of the groove is $L_1$, and a height of the cross section of the groove is $H_1$, wherein $H_1 \leq H_2/2$, $L_1 \leq \frac{1}{6} \times L_2$, and a length of $L_2$ is 13.44 mm-25 mm;

the front-row integrated compact comprises a polycrystalline diamond layer and a cemented carbide layer, and the polycrystalline diamond layer is fixedly connected to a top end of the cemented carbide layer;

wherein $H_2$ represents a thickness of the polycrystalline diamond layer and $H_3$ represents a thickness of the cemented carbide layer, wherein an exposure height $\Delta L_1$ of the front-row integrated compact between a blade radial line and a radial tooth distribution line of the tooth position of the front-row integrated compact, and a height difference $\Delta L_2$ between the front-row integrated compact and the rear-row is formed between the radial tooth distribution line of the tooth position of the front-row integrated compact and a radial tooth distribution line of the tooth position of the rear-row, and wherein $0 \leq \Delta L_2/\Delta L_1 \leq 0.5$, and wherein the height difference $\Delta L_2$ can be increased to make the unconfined rock ridge higher, so as to improve the crushing efficiency of the integrated compact cutting rock ridge;

wherein in an event of occurrence of ring out phenomenon on the PDC bit the B-type cutting structures are arranged on nose and shoulder parts of a PDC bit body, in an event of occurrence of coring phenomenon on the PDC bit the A-type cutting structures are arranged on the inner cone part of the PDC bit body, and in an event of occurrence of the ring out phenomenon and the coring phenomenon simultaneously, the A-type cutting structures and the B-type cutting structures are simultaneously arranged on the bit body.

2. The cutting structure for the PDC bit according to claim 1, wherein an included angle $\alpha_1$ and an included angle $\alpha_2$ are set between the cross section of the groove and the rectangle, and the included angle $\alpha_1$ and the included angle $\alpha_2$ are 0°-90°.

3. The cutting structure for the PDC bit according to claim 2, wherein in the A-type cutting structures, a front-row integrated compact is provided with a point $i_1$ and a point $i_2$, and a curve between the point $i_1$ and the point $i_2$ has no curvature; in the B-type cutting structures, the front-row integrated compact is provided with a point $i_3$ and a point $i_4$, and curvature is set between the point $i_3$ and the point $i_4$, and the curvature between the point $i_3$ and the point $i_4$ is aligned with curvature of the curvature part on the bit.

4. The cutting structure for the PDC bit according to claim 3, wherein a height of the front-row integrated compact is lower than a height of the rear-row of the conical tooth.

5. The PDC bit for the highly abrasive formations according to claim 4, wherein in the radial tooth distribution line of the tooth position of the front-row integrated compact and the radial tooth distribution line of the tooth position of the rear-row, $l_1$ is a central axis of the rear-row of the conical tooth, and $l_1^{\ 1}$ and $l_1^{\ 2}$ are variants of $l_1$, and $l_1$, $l_1^{\ 1}$, and $l_1^{\ 2}$ intersect and are perpendicular to the radial tooth distribution line of the tooth position of the front-row integrated compact; if the radial tooth distribution line of the tooth position of the front-row integrated compact has curvature, $l_1$, $l_1^{\ 1}$ and $l_1^{\ 2}$ are perpendicular to tangent lines $Tl_1$, $Tl_2$ and $Tl_3$ drawn by arcs at intersection points, and a radial position of the rear-row of the conical tooth under $\Delta L_2$ is adjustable by adjusting a position of $l_1$ to $l_1^1$ and $l_1^2$.

* * * * *